Aug. 14, 1928.
H. J. BLAKESLEE
1,680,849
ELECTRIC METER TESTING APPARATUS
Filed May 26, 1927
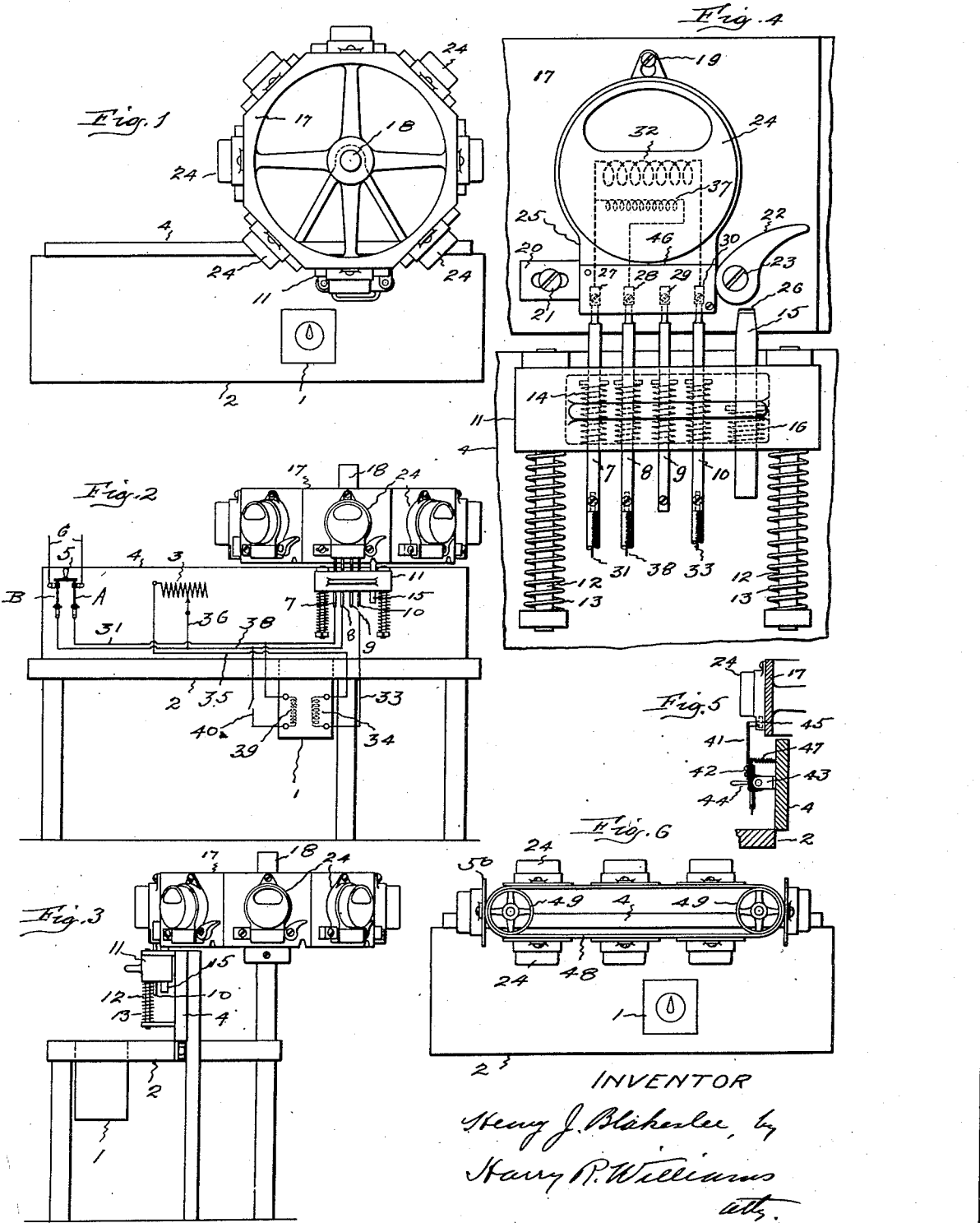
INVENTOR
Henry J. Blakeslee, by
Harry R. Williams
atty.

Patented Aug. 14, 1928.

1,680,849

UNITED STATES PATENT OFFICE.

HENRY J. BLAKESLEE, OF HARTFORD, CONNECTICUT.

ELECTRIC-METER-TESTING APPARATUS.

Application filed May 26, 1927. Serial No. 194,352.

This invention relates to apparatus which is designed to be used in a shop or power plant for testing electricity meters.

In testing electricity meters, particularly watt hour meters, by the methods in general use considerable time is required to bring the meters to and remove them from the testing locality and connecting and disconnecting them in the circuit with the standard meter, the source of current and the artificial load. The object of the present invention is to provide apparatus by means of which a series of meters can, one at a time in succession, be rapidly brought to testing position and quickly connected in the circuit with the standard, load and source, and after the readings are noted can be instantly disconnected from the circuit and moved out of testing position.

In the apparatus illustrated as embodying the invention the standard meter and the artificial load, and the source and meter testing connections are arranged on a table or bench, and the meters to be tested are placed upon a carrier which is so located and has such a movement that each meter may in succession be brought into and locked in such a position that the conducting terminals in the terminal chamber of the meter will accurately register with the conducting terminals of the test circuit which includes the source, load and standard. After each meter is tested as it is released and moved away a following meter is brought into position to register with the testing terminals.

In the accompanying drawings Fig. 1 shows a plan of an apparatus that embodies the invention. Fig. 2 shows a front elevation of the same. Fig. 3 is a side elevation. Fig. 4 shows on larger scale a front view of the test circuit terminals engaged with the terminals in a meter terminal chamber. Fig. 5 shows a modified arrangement of the test terminal connections. Fig. 6 is a plan showing an alternate form of meter carrier.

In the apparatus illustrated the standard meter 1 is shown as fastened to the underside of the top of a table or bench 2 so that it may be read from above. The variable artificial load 3 is indicated as fastened to a vertical panel 4 at the back of the table. The main switch 5 for connecting or disconnecting the wires 6 of the source of testing current is also shown as attached to the upright panel.

The testing terminals 7, 8, 9 and 10 are arranged in a block 11 that is shown as movably supported on posts 12. This block is normally held raised by springs 13 and each of the test terminals is mounted on a cushioning spring 14. The block also carries an index bolt 15 that is mounted on a cushioning spring 16. The test terminals and the index bolt are movable together with the supporting block but each has a little independent movement therein so that it will adjust itself to the position required for performing its function.

Supported so as to travel above the table is the meter carrier. The carrier first illustrated is in the form of a polygonal drum 17 mounted to rotate on a post 18. Near the top of each face of the drum is a screw or stud 19. At one side near the bottom of each face of the drum is an abutment 20 adjustably secured by a screw 21. Opposite the abutment is a cam shaped clamp 22 pivoted on a screw 23. A meter 24 is placed on each face of the drum, being supported by the screw 19 at the top and having one side of its terminal chamber 25 pressed against the abutment 20 by the clamp 22 that is turned against the other side of the terminal chamber.

In the lower edge of each face of the drum is a notch 26 adapted to receive the index bolt 15, the notch and index bolt being so related that when the drum is locked the front meter is in such position that the terminals 27, 28, 29, 30, in the meter terminal chamber will be in alignment with and can be engaged by the testing terminals 7, 8, 9 and 10, as illustrated in Fig. 4. When the block 11 is pressed down the test terminals and the index bolt are lowered so that the drum with the meters can be turned, and when a meter is in testing position the index bolt carried by the block enters a notch in the drum and locates it so that the test terminals will engage with the meter terminals.

A meter for a two wire system is illustrated. In this case the test terminal 7 which is connected by wire 31 with the pole A of the main switch, is connected through terminal 27 with one end of the meter current coil 32. The other end of the meter current coil is connected through meter terminal 30 with test terminal 10 that is connected by wire 33 with one end of the current coil 34 of the standard. The other end of the standard current coil is connected by a wire 35 with one side of the load, the other side of the load being connected by a wire 36 with the pole B of the main switch. The test terminal 8 which is connected through meter terminal 28 with the potential coil 37 of the meter, is connected by wire 38 with the pole B of the main switch, and the potential coil 39 of the standard is connected across the circuit between wires 31 and 38 in the usual manner of making these connections. A switch 40 is arranged to open and close the potential coil circuit of the standard. The test terminal 9, in the present case, is shown as idle, it being provided for use in order that tests may be made with three as well as two wire meters.

In the construction above described the testing terminals are designed to pass through the circuit wire openings into the lower end of the meter terminal chamber. Instead of such an arrangement the test terminals 41 may be, as illustrated in Fig. 5, attached to an insulating block 42 that is pivoted on a bracket 43 fastened to the back panel and provided with a handle 44. These terminals may be swung into and out of engagement with the binding screws 45 of the terminals in the meter chamber when the cover 46 is removed, a spring 47 being arranged to normally turn the block so that the fingers will engage with these screws.

The meter carrier instead of being in the shape of a drum, as above described, may be in the form of a belt 48 mounted to travel around pulleys 49, Fig. 6. This belt is desirably provided with plates 50 on which the meters may be conveniently hung and clamped, as previously described.

This meter testing apparatus to be used at maximum efficiency requires two operators. One operator can hang and clamp the meters in their positions on the carrier and make the preliminary records, and also remove the meter after they have been tested. The other operator can move the meter carrier to bring a meter to test position in which he locks the carrier and at the same time makes the test connections. After making the tests, and if necessary adjusting the meter, the carrier is turned to bring an untested meter to testing position and the tested meter to a position in which the other operator can unlock and remove it. The apparatus may be used to advantage by one operator in which case he may first hang all of the meters, moving the carrier one revolution. He then tests the meters consecutively, after which he removes them, preferably hanging an untested meter in the position from which he removes a tested meter. The apparatus may also obviously be used with the carrier locked in one position, hanging, testing, and removing the meters in one locality, but a considerable saving in time is effected by performing one operation in succession in each of the meters.

The invention claimed is:—

1. An electricity meter testing apparatus comprising a support, a plurality of test circuit terminals movably mounted on said support, a standard meter, an artificial load and a source of current connected with said test terminals, a carrier adapted to receive a plurality of meters and convey them in succession into a position in which the meter terminals may be engaged by the test terminals and means for moving said test circuit terminals into engagement with the meter terminals.

2. An electricity meter testing apparatus comprising a support, a plurality of test circuit terminals movably mounted on said support, a standard meter, an artificial load and a source of current connected with said test terminals, a rotatable drum adapted to receive a plurality of meters and convey them in succession into a position in which the meter terminals may be engaged by the test terminals and means for moving said test circuit terminals into engagement with the meter terminals.

3. An electricity meter testing apparatus comprising a support, test circuit terminals movably mounted on said support, a standard meter, an artificial load and a source of current connected with said test terminals, a rotatable drum adapted to receive a plurality of meters and convey them in succession into a position in which the meter terminals may be engaged by the test terminals, and means for locking said drum when a meter is in position to have its terminal engaged by the test terminals.

4. An electricity meter testing apparatus comprising a support, test circuit terminals movably mounted on said support, a standard meter, an artificial load and a source of current connected with said test terminals, and a carrier with studs, abutments and clamps for holding a plurality of meters, said carrier being movable to convey the meters in succession into a position in which the meter terminals may be engaged by the test terminals.

5. An electricity meter testing apparatus comprising a support, test circuit terminals movably mounted on said support, an index bolt movable with the test terminals, a standard meter, an artificial load and a source of current connected with said test terminals, and a carrier adapted to receive a plurality of meters and convey them in succession into a position in which the meter terminals may be engaged by the test terminals, said carrier having notches adapted to receive said index bolt and retain a meter in testing position.

6. An electricity meter testing apparatus comprising a support, reciprocatory test circuit terminals mounted on said support, a reciprocatory bolt movable with said terminals, a standard meter, an artificial load and a source of current connected with said test terminals, and a rotatable drum adapted to receive a plurality of meters and convey them in succession into a position in which the said bolt may be engaged with the drum and the meter terminals engaged by the test terminals.

7. An electricity meter testing apparatus comprising a support, a plurality of test circuit terminals movably mounted on said support, a carrier adapted to convey a plurality of meters in succession into a position in which the meter terminals may be engaged by the test terminals, and means for positioning the meters so said test terminals will engage the conducting terminals of the meters mounted on and movable with the carrier.

HENRY J. BLAKESLEE.